3,281,388
FLEXIBILIZED POLYACROLEIN-BISULFITE ADDUCTS CONTAINING GLYCOLS OR GLYCOL DERIVATIVES
Frank J. Welch, Charleston, and Thomas L. Dawson, South Charleston, W. Va., assignors to Union Carbide Corporation, a corporation of New York
No Drawing. Filed June 27, 1963, Ser. No. 290,953
10 Claims. (Cl. 260—33.4)

The present invention is concerned with polyacrolein-bisulfite adducts, and particularly, with water-soluble films of polyacrolein-bisulfite adducts containing a flexibilizing amount of one or more of the glycols or glycol derivatives hereinbelow defined.

It was heretofore known that water-soluble films could be cast from aqueous solutions of water-soluble polyacrolein-bisulfite adducts. Unfortunately, however, such films have not been found completely satisfactory or received commercial attention, particularly when unsupported, due primarily to the brittleness with which such films are ordinarily characterized.

Unexpectedly, it has now been found that certain of these water-soluble polyacrolein-bisulfite adducts can be admixed with a minor amount of one or more of the substantially compatible water-soluble glycols or glycol derivatives hereinbelow defined to produce water-soluble films characterized by materially enhanced flexibility. The present invention also provides films which are substantially clear and tough. Due to the somewhat hygroscopic nature of the film, their physical properties in any given instance will depend to some extent upon the relative humidity to which they are exposed. By way of illustration, films which are more nearly anhydrous evidence higher tensile strength and lower flexibility and elongation. Conversely, exposure to increased relative humidity yields films of lower tensile strength and higher flexibility and elongation. For similar reasons, when the films are dried, their physical properties will also depend to some extent upon the drying temperature, the latter having a direct effect upon the amount of water removed. The resultant films are eminently suited for use as water-soluble packaging materials, coatings and the like.

Not all glycols or glycol derivatives are water-soluble, and of those that are, not all are substantially compatible with the polyacrolein-bisulfite adducts contemplated by this invention. The particular glycols and glycol derivatives which have been found to be useful in accordance with this invention are the compounds represented by the formula:

$$H(OCH_2CH_2)_nOR \qquad I$$

wherein R is selected from the group consisting of hydrogen, the linear and branched chain lower alkyl radicals containing from 1 to about 4 carbon atoms, and the R'CO— acyl radicals wherein R' is a linear or branched chain lower alkyl radical containing from 1 to about 3 carbon atoms, the preferred lower alkyl radical being the methyl radical in each instance; and $n$ is an integer of from 1 to about 50, or somewhat higher, and preferably from 3 to about 40. Thus, the glycols and glycol derivatives contemplated by this invention can be defined more specifically as mono- and polyethylene glycols, the latter having a molecular weight of up to about 2,200 or somewhat higher, and the monoalkyl ethers and monoalkanoate esters thereof.

Suitable glycols and glycol derivatives include, for example: ethylene glycol, diethylene glycol, triethylene glycol, ethylene glycol monomethyl ether, ethylene glycol monobutyl ether, ethylene glycol monoacetate, ethylene glycol monobutyrate, diethylene glycol monomethyl ether, diethylene glycol monoacetate, triethylene glycol monomethyl ether, triethylene glycol monoacetate, and the like. Also included are the mixed higher molecular weight polyethylene glycols having an average molecular weight of 200, 300, 400, 600, 1,000, 2,000 etc., and the monoalkyl ethers thereof, produced by the conventional reaction of ethylene oxide with water or a lower alkanol containing from 1 to about 4 carbon atoms, as well as the monoalkanoate esters of such glycols containing from 1 to about 3 carbon atoms in the alkyl moiety thereof.

The higher molecular weight glycols and glycol derivatives represented by the foregoing formula wherein $n$ is substantially above 50, e.g. 80 to 100, or higher, are ordinarily incompatible with the polyacrolein-bisulfite adducts to a substantial extent, and their use consequently yields films which are brittle and excessively cloudy. On the other hand, as the molecular weight of the glycol or glycol derivative is decreased within the operable range, softer films which dissolve in water at a slower rate are obtained. It is to be noted here that a slight amount of incompatibility between the glycol or glycol derivative and the polyacrolein-bisulfite adduct is not necessarily undesirable, and may in fact be sought in order to improve the strength of the film consistent with flexibility, providing the concomitant cloudiness of the resulting film is not objectionable. Thus, the molecular weight of the glycol or glycol derivative can vary broadly depending upon the physical properties desired. Moreover, while only polyethylene glycols and glycol derivatives have hereinabove been described, mixed water-soluble, substantially compatible polyalkylene glycols and glycol derivatives comprised predominantly of repetitive oxyethylene groups together with a minor amount of other oxyalkylene groups can also be employed in like manner.

The polyacrolein-bisulfite adducts contemplated by this invention are known compounds and are described, for instance, in copending application Serial No. 154,822, filed November 24, 1961, and now abandoned, the disclosure of which is incorporated herein by reference. More particularly, the polyacrolein-bisulfite adducts are the water-soluble compounds produced by the reaction of a normally solid, water-insoluble acrolein homopolymer, preferably having a reduced viscosity of from about 0.5 to about 15, or higher, and more preferably from about 1 to about 10, measured at 30° C. from a solution containing 0.2 gram of polymer in 100 ml. of a saturated aqueous sulfur dioxide solution, with a metal bisulfite and preferably an alkali metal bisulfite, such as sodium bisulfite, potassium bisulfite, or its equivalent such as ammonium bisulfite and the like, in an amount sufficient to render the normally water-insoluble polymer water-soluble.

It has been found that the proportion in which the metal bisulfite is reacted with the polymer is of ultimate importance to the utilization of the resultant adduct in accordance with this invention. To this end, the metal bisulfite is typically reacted with the polymer in a water-solubilizing proportion up to about 0.6 mole, or somewhat higher, and preferably from about 0.2 to about 0.4 mole, of the metal bisulfite per mole of polyacrolein on a theoretical monomer basis, i.e. per recurring acrolein unit. Within this range, the lesser proportions of metal bisulfite to polyacrolein are ordinarily and preferably employed in connection with the utilization of operable higher molecular weight glycols or glycol derivatives in order to improve or overcome the tendency toward substantial incompatibility and accompanying brittleness usually engendered by the increasing molecular weight of the glycol or glycol derivatives as discussed above. While the reaction of substantially higher proportions of metal bisulfite with polyacrolein also produces water-soluble adducts, such adducts, which generally incorporate increasing amounts of "free" or unreacted bisulfite due to the reaction equilibrium established, also demonstrate increasing incompatibility with the aforementioned glycols and glycol derivatives and yield films when admixed therewith of increasing brittleness and opacity. The polyacrolein-bisulfite adducts contemplated by this invention, on the other hand, are substantially free from unreacted bisulfite. Without wishing to be bound by theory, it is believed that the presence of unreacted bisulfite is at least in part responsible for the incompatibility encountered when utilizing polyacrolein-bisulfite adducts produced by reacting the metal bisulfite with polyacrolein in proportions substantially in excess of those described above.

In producing the flexible films of this invention, any flexibilizing amount of one or more of the glycols or glycol derivatives hereinabove defined can be admixed with the polyacrolein-bisulfite adduct, such amount being readily determinable by one skilled in the art in light of this disclosure. Particularly good results are realizable utilizing the glycol or glycol derivative in a proportion of from about 0.4 to about 1.5 parts by weight, or somewhat higher, and especially from about 0.5 to about 1 part by weight thereof based upon the weight of the polyacrolein-metal bisulfite adduct, i.e. in a glycol or glycol derivative to polyacrolein-metal bisulfite weight ratio of from 0.4:1 to 1.5 to 1, or more and especially from 0.5:1 to 1:1. Little improvement in flexibility is ordinarily realized utilizing lesser proportions of the glycol or glycol derivative. The use of greater proportions, on the other hand, while improving flexibility, yields films which are substantially softer and less tough, and which dissolve in water at a much slower rate. The optimum proportion in any given instance will also depend upon the particular glycol or glycol derivative employed as well as the proportion of metal bisulfite reacted with polyacrolein in producing the adduct being flexibilized. Thus, for instance, higher proportions of glycol or glycol derivative is generally utilized commensurate with an increase in the molecular weight thereof in order to counteract or offset the tendency toward incompatibility and brittleness ordinarily engendered by such increase in molecular weight as discussed above.

The formation of the flexible films of this invention can be carried out in any convenient manner. By way of illustration, the films can be cast conventionally from aqueous solutions containing the polyacrolein-bisulfite adduct and the glycol or glycol derivative in the proportions described above, then dried. Aqueous solutions of the polyacrolein-bisulfite adduct, it is to be noted, are frequently encountered in connection with the production of the adduct. Hence, the film-forming solutions contemplated by this invention can be obtained conveniently by the further addition of the glycol or glycol derivative to such aqueous solution. Alternatively, both the polyacrolein-bisulfite adduct, when available in solid form, and the glycol or glycol derivative can be dissolved in water to form such solution. The flexible films of this invention may also be formed by milling the polyacrolein-metal bisulfite adduct together with the glycol or glycol derivative in the proportions described above. Thus, the term "film" as employed herein is also intended to encompass milled sheeting.

The present invention can be illustrated further by the following specific examples of its practice, which, however, are in no way intended to limit the invention.

*Example I*

In a series of experiments, 10-gram aliquots of 15 percent by weight aqueous solutions of the sodium bisulfite adducts of polyacrolein (reduced viscosity about 2) containing about 0.3 and about 0.5 mole of sodium bisulfite per mole of polyacrolein (on a theoretical monomer basis) were placed in separate test tubes. Varying amounts of ethylene glycol were then added to each of the solutions in the test tubes. The tubes were capped and rotated end-over-end for a period of two hours to insure thorough mixing. Thereafter, the contents of the tubes were divided equally and poured into petri dishes to cast films from the mixture. One set of films thus cast was dried at room temperature for 72 hours; the other set was dried in a 60° C. circulating air oven for 48 hrs. The flexibility of the films was subjectively evaluated and their solubility determined by measuring the time required for complete dissolution in approximately 100 ml. of water at room temperature without agitation. The results obtained are tabulated below in Table A. In the table, B/P indicates the mole ratio of sodium bisulfite to polyacrolein in the adduct (on a theoretical monomer basis), G/P-B indicates the weight ratio of glycol to polyacrolein-bisulfite adduct employed.

TABLE A

| B/P | G/P-B | Drying | | Film Property | Solubility (Hrs.) |
| --- | --- | --- | --- | --- | --- |
| | | Temp. (° C.) | Time (Hrs.) | | |
| 0.5 | 1.0 | 26 | 72 | Flexible | <68 |
| 0.5 | 0.5 | 26 | 72 | ___do___ | <44 |
| 0.5 | 0.2 | 26 | 72 | Brittle | <5 |
| 0.5 | 1.0 | 60 | 48 | Flexible | <140 |
| 0.5 | 0.5 | 60 | 48 | ___do___ | <44 |
| 0.5 | 0.2 | 60 | 48 | Brittle | <44 |
| 0.3 | 1.0 | 26 | 72 | Flexible | <44 |
| 0.3 | 0.5 | 26 | 72 | ___do___ | <20 |
| 0.3 | 0.1 | 26 | 72 | Brittle | <20 |
| 0.3 | 1.0 | 60 | 48 | Flexible | <68 |
| 0.3 | 0.5 | 60 | 48 | ___do___ | <44 |
| 0.3 | 0.2 | 60 | 48 | Brittle | <44 |

*Example II*

In a manner similar to that described above in Example I, films were prepared from the same polyacrolein-bisulfite adducts, employing different glycols in admixture therewith. The films were dried in each instance at a temperature of 60° C. for 18 hrs. The results obtained are tabulated below in Table B.

TABLE B

| Glycol | B/P | G/P-B | Film Property | Solubility (Days) |
| --- | --- | --- | --- | --- |
| Diethylene Glycol | 0.5 | 1.0 | Flexible | <5 |
| Triethylene Glycol | 0.5 | 1.0 | ___do___ | <3 |
| Polyethylene Glycol 200 | 0.5 | 1.0 | ___do___ | <3 |
| Diethylene Glycol | 0.5 | 0.5 | ___do___ | <3 |
| Diethylene Glycol | 0.3 | 1.0 | ___do___ | <6 |
| Triethylene Glycol | 0.3 | 1.0 | ___do___ | <3 |
| Polyethylene Glycol 200 | 0.3 | 1.0 | ___do___ | <3 |
| Diethylene Glycol | 0.3 | 0.5 | ___do___ | <3 |
| Triethylene Glycol | 0.3 | 0.5 | ___do___ | <3 |
| Polyethylene Glycol 200 | 0.3 | 0.5 | ___do___ | <3 |

In like manner, flexible films are also obtained employing equal amounts of the glycol derivatives triethylene glyco monobutyl ether and diethylene glycol monoacetate in place of the glycols tabulated.

Example III

In a manner similar to that described above in Example I, films were prepared from the same polyacrolein-bisulfite adducts employing polyethylene glycols of varying average molecular weight in admixture therewith. The films were dried at room temperature and dissolved in water at room temperature in less than 3 days. The results are tabulated below in Table C.

TABLE C

| PEG (Avg. Mol. Wt.) | B/P | G/P-B | Film Property |
|---|---|---|---|
| 300 | 0.5 | 1.0 | Flexible. |
| 400 | 0.5 | 1.0 | Do. |
| 600 | 0.5 | 1.0 | Do. |
| 300 | 0.5 | 0.5 | Do. |
| 400 | 0.5 | 0.5 | Do. |
| 300 | 0.3 | 1.0 | Do. |
| 400 | 0.3 | 1.0 | Do. |
| 600 | 0.3 | 1.0 | Do. |
| 1,000 | 0.3 | 1.0 | Do. |
| (¹) | 0.3 | 1.0 | Do. |
| 300 | 0.3 | 0.5 | Do. |
| 400 | 0.3 | 0.5 | Do. |
| 600 | 0.3 | 0.5 | Do. |
| 1,000 | 0.3 | 0.5 | Do. |
| (¹) | 0.3 | 0.5 | Do. |

¹ A 50-50 mixture of polyethylene glycols having average molecular weight of 300 and 1,500.

In like manner, flexible films are also obtained employing equal amounts of a polyacrolein-potassium bisulfite adduct containing an equal molar proportion of potassium bisulfite to polyacrolein in place of sodium bisulfite.

What is claimed is:

1. The water-soluble, flexible film comprising (a) an adduct of normally solid, water-insoluble polyacrolein with a water-solubilizing proportion up to about 0.6 mole of an alkali metal bisulfite per mole of said polyacrolein on a theoretical monomer basis, and (b) a flexibilizing amount of a compound of the formula:

$$H(OCH_2CH_2)_nOR$$

wherein R is selected from the group consisting of hydrogen, the alkyl radicals of from 1 to 4 carbon atoms, and the R'CO— radicals wherein R' is alkyl radical of from 1 to 3 carbon atoms; and $n$ is an integer of from 1 to about 50.

2. The water-soluble, flexible film comprising (a) an adduct of normally solid, water-insoluble polyacrolein with a water-solubilizing proportion up to about 0.6 mole of an alkali metal bisulfite per mole of said polyacrolein on a theoretical monomer basis, and (b) a flexibilizing amount of a glycol of the formula:

$$H(OCH_2CH_2)_nOH$$

wherein $n$ is an integer of from 1 to about 50.

3. The water-soluble, flexible film comprising (a) an adduct of normaly solid, water-insoluble polyacrolein with from about 0.2 to about 0.4 mole of an alkali metal bisulfite per mole of said polyacrolein on a theoretical monomer basis, and (b) a glycol of the formula $$H(OCH_2CH_2)_nOH$$

wherein $n$ is an integer of from 1 to about 50, in a weight ratio of glycol to said adduct in the range of from about 0.4:1 to about 1.5:1.

4. The water soluble, flexible film comprising (a) an adduct of normally solid, water-insoluble polyacrolein with from about 0.2 to about 0.4 mole of an alkali metal bisulfite per mole of said polyacrolein on a theoretical monomer basis, and (b) a glycol of the formula:

$$H(OCH_2CH_2)_nOH$$

wherein $n$ is an integer of from 3 to about 40, in a weight ratio of glycol to said adduct in the range of from about 0.5:1 to about 1:1.

5. The water-soluble, flexible film comprising (a) an adduct of normally solid, water-insoluble polyacrolein with a water-solubilizing proportion up to about 0.6 mole of sodium bisulfite per mole of said polyacrolein on a theoretical monomer basis, and (b) a glycol of the formula:

$$H(OCH_2CH_2)_nOH$$

wherein $n$ is an integer of from 1 to about 50, in a weight ratio of glycol to said adduct in the range of from about 0.4:1 to about 1.5:1.

6. The water-soluble, flexible film in accordance with claim 5 wherein said glycol is ethylene glycol.

7. The water-soluble, flexible film in accordance with claim 5 wherein said glycol is diethylene glycol.

8. The water-soluble, flexible film in accordance with claim 5 wherein said glycol is triethylene glycol.

9. The water-soluble, flexible film in accordance with claim 5 wherein said glycol is a polyethylene glycol having an average molecular weight of about 400.

10. The water-soluble, flexible film in accordance with claim 5 wherein said glycol is a polyethylene glycol having an average molecular weight of about 1,000.

References Cited by the Examiner

UNITED STATES PATENTS

| 3,079,280 | 2/1963 | Houff et al. | 260—67 |
| 3,079,357 | 2/1963 | Fischer. | |
| 3,084,992 | 4/1963 | Schlack et al. | |
| 3,154,599 | 10/1964 | Wismer et al. | 260—35.4 |

OTHER REFERENCES

"Carbowax Compounds and Polyethylene Glycols," published by Carbide and Carbon Chemicals Corp., New York, June 30, 1946; pages 3–5 relied on.

MORRIS LIEBMAN, *Primary Examiner.*

J. W. BEHRINGER, J. E. CALLAGHAM,
*Assistant Examiners.*